Dec. 1, 1964   N. M. RAY   3,159,376
SELF-CENTERING BUTTERFLY VALVE
Filed Aug. 31, 1961   2 Sheets-Sheet 1

INVENTOR.
NICHOLAS M. RAY
BY
ATTORNEYS

INVENTOR.
NICHOLAS M. RAY

United States Patent Office 3,159,376
Patented Dec. 1, 1964

3,159,376
SELF-CENTERING BUTTERFLY VALVE
Nicholas M. Ray, 61 E. 86th St., New York 28, N.Y.
Filed Aug. 31, 1961, Ser. No. 135,302
8 Claims. (Cl. 251—86)

This invention relates generally to valves of butterfly design and particularly to improved mounting, actuating and sealing arrangements for valves of this type.

Butterfly valves are capable of performing many useful functions, and are particularly adapted to the regulation of a relatively large volume fluid flow in straight-through passages of the venturi-type, for example. In such an arrangement, it has been more or less conventional to mount the movable butterfly member about a pivot axis which is perpendicular to the longitudinal axis of the venturi and to permit peripheral portions of the butterfly to sealingly engage against a valve seat within the venturi. The butterfly member is generally pivoted about an actuating spindle coincident with the pivot axis of the butterfly and the spindle extends through and externally of the body of the venturi to permit rotation of the butterfly. In order to decrease the possibility of leakage around the butterfly when in its closed position, it is also conventional to mount an O-ring in a peripheral groove in edge portions of the butterfly and to provide a seal about portions of the actuating spindle passing through the body of the venturi.

However, it will be appreciated that certain difficulties arise in a configuration of this kind since the O-ring seal must nest against a seat internally of the venturi passage, which is broken by virtue of the spindle passing therethrough. The results of this sealing arrangement have not therefore been wholly satisfactory.

Attempts have been made to offset the pivot axis of the butterfly member from the axis of rotation of the spindle in order to provide a continuous or uninterrupted valve seat within the body of the venturi against which the O-ring may seal. One proposed form of construction of which I am aware, mounts the butterfly member upon several articulating links which are actuated remotely of the pivot axis of the butterfly member to cause butterfly rotation. However, this proposed arrangement is complex and additionally does not offer support for the butterfly member in a manner to assure the closure of the butterfly at all times in full sealing engagement with its seat.

In order for a butterfly member which mounts a peripheral O-ring or similar seal, to be truly effective as a sealing agent, particularly during low pressure differential sealing, it is necessary, when the butterfly is closed, that the O-ring be in evenly distributed contact with its valve seat. The sealing problem becomes particularly acute when low pressure differential sealing is attempted, that is, when the pressure on one side of the butterfly in its fully closed position is only slightly greater than pressure against its reverse side. Many modern systems require such low pressure differential sealing to provide various control pressures. During low pressure sealing, distortion of the O-ring, due to pressure, may be slight requiring near perfect engagement of the O-ring respective of its seat.

During relatively higher pressure sealing, occurring, for example, after initial sealing under low pressure, followed by a gradual increase in pressure, distortion of the O-ring will occur. If the O-ring is not centered or is not in even engagement with the seat, the material of the O-ring will tend to flow toward points of reduced pressure, or leakage points between its periphery and the valve seat. If clearances between the O-ring and valve seat are sufficiently great, under higher pressure the material of the O-ring may actually be extruded from such leakage points, resulting in so-called O-ring "blow-out."

In order to obviate the several difficulties outlined above, I have devised an improved butterfly valve in which as one of the primary aspects of the invention, the butterfly member, including a peripherally mounted O-ring seal, is permitted to float under the moving influence of fluid pressure, into an optimum sealing engagement with its valve seat. The forces acting upon the O-ring follow generally principles of dynamic and static pressure distribution in a moving fluid. Thus, as the butterfly nears or reaches its full closure position, pressure upon the O-ring in a radial direction tending to oppose sealing will be least at points where the clearance between the O-ring and its seat are greatest, and conversely radial pressure upon the O-ring is greatest where clearances are at a minimum. By permitting the butterfly member to float when subjected to unequal pressures about its periphery and upon the O-ring, I provide a means for automatically centering the butterfly and O-ring with respect to the valve seat, and for assuring the even engagement and distribution of the O-ring with its seat when the butterfly assumes its closed position.

More specifically, I mount the butterfly member upon an arm and I provide independent freedom of movement of the butterfly member under the effect of fluid pressure with respect to its mounting arm and with respect to the actuating mechanism for the butterfly. The freedom provided is sufficient for the butterfly member to be moved and to be centered with respect to the valve seat by the pressure of the fluid within the valve body. Consequently, the O-ring seal may more evenly engage the valve seat and distortion of the O-ring is substantially eliminated.

In combination with the free-floating mounting of the butterfly member, I provide an actuating spindle which is spaced from the axis of rotation of the butterfly so that among other advantages, the spindle may be sealed as it passes through the valve casing without disrupting the formation of the valve seat. Attached to the spindle is a rocker arm which contacts the face of the butterfly on opposite sides of the butterfly pivot axis. Upon rotation of the actuating spindle, one end or the other of the rocker arm slides against a portion of the face of the butterfly to urge the latter into open or closed positions. Thus, the freedom of the butterfly member to float in accordance with fluid pressure is entirely unimpeded during and after the actuation of the butterfly member.

In the following description reference is made by way of a non-limiting example to the one form of construction of a butterfly valve devised in accordance with the invention, and illustrated in the accompanying drawing in which.

Figure 1:
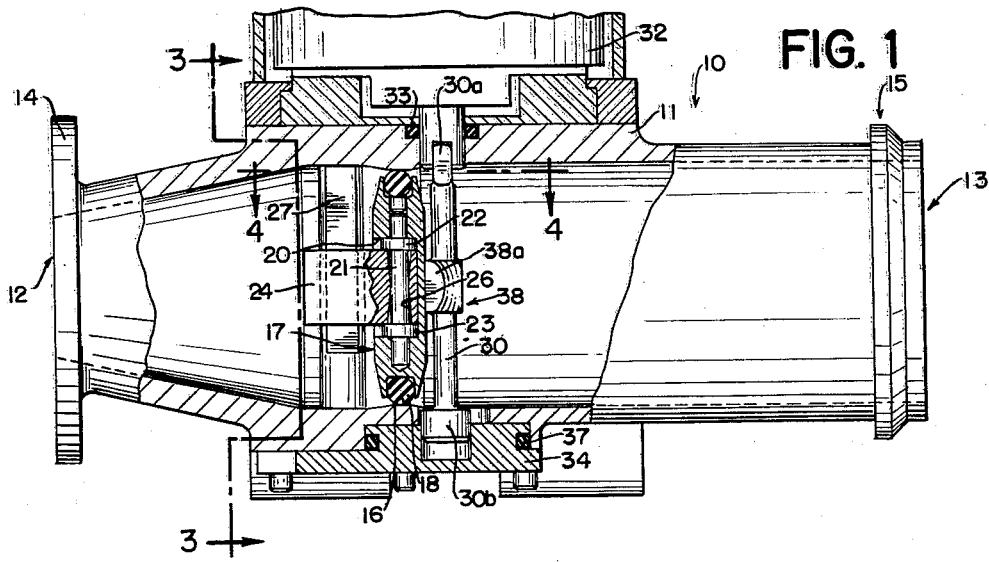
FIG. 1 is a side elevation, partially in cross section of a venturi including a butterfly valve constructed according to the principles of the present invention wherein the butterfly member is in its fully closed position.
Figure 2:
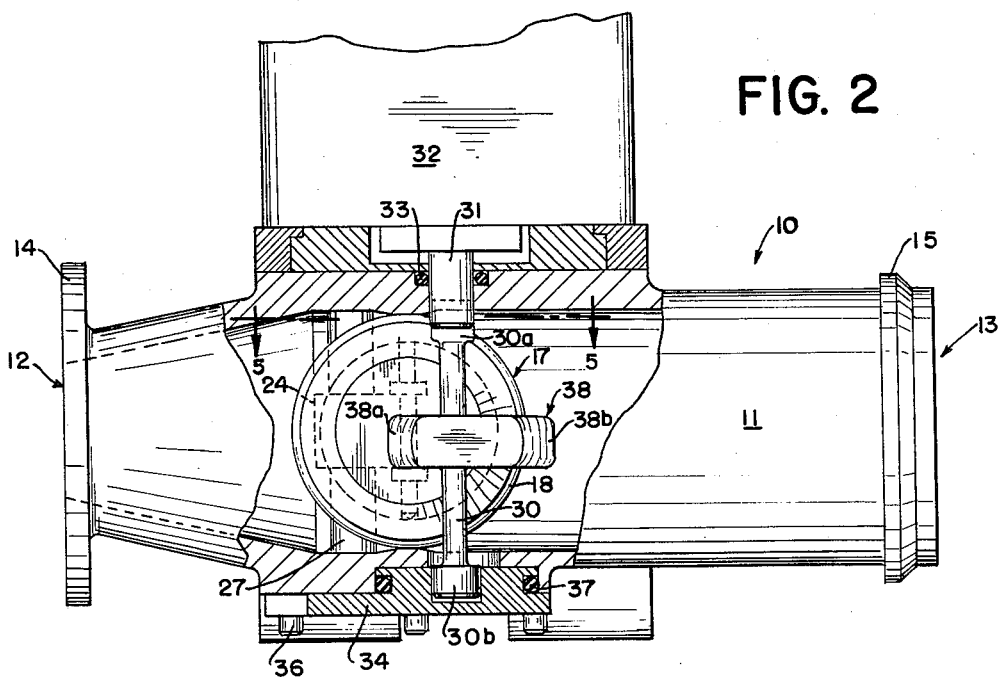
FIG. 2 is a view similar to that of FIG. 1 with the butterfly member moved to a fully opened position.

Referring now to the drawing, a valve body 10 has been illustrated having a casing wall 11. The body 10 is shaped as a venturi having a smaller diameter exhaust 12 and a larger diameter inlet 13 equipped with mounting flanges 14, 15 to permit the attachment of the valve body into a line containing a moving fluid. The valve body forms at 16 a restricted diameter which comprises a valve seat. A butterfly member 17 is mounted within the valve body about a pivot axis which extends generally intermediate the seat 16. An O-ring 18 is held within a peripheral groove 19 in edge portions of the butterfly member 17 and is adapted in the fully closed position of the butterfly member to sealingly engage the surface of the seat 16. Within the body of the butterfly 17 is a recess 20 which accommodates a pivot pin 21. The pin 21 has upper and lower collars 22, 23 of enlarged diameter which securely engage upper and lower horizontal portions of the recess 20.

According to the invention, a mounting arm 24 is provided having at one end a passage 26 to receive the pin 21. The passage 26 is advantageously tapered at each end toward its center where the arm 24 engages the pin 21 in a sliding fit. In a preferred embodiment, the clearance between the pin 21 and the tapered portions of the passage 26 is sufficient to permit universal movement of the pin 21 and thus the butterfly 17, for an angular distance of approximately one-half degree from a center or vertical position. This movement is permitted so that tilting of the butterfly may occur with respect to the longitudinal axis of the valve body and with respect to an axis perpendicular thereto.

Figure 3:
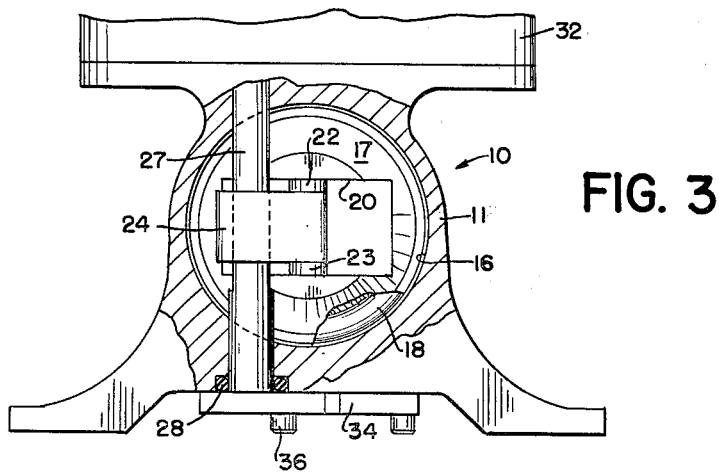
FIG. 3 is a view taken in the direction of the arrows 3—3 of FIG. 1.
Figure 4:
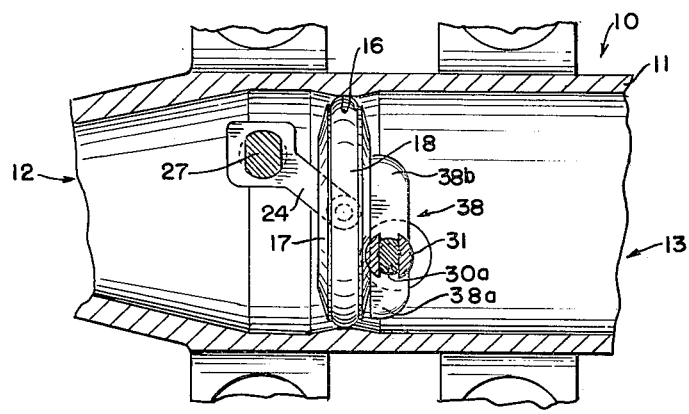
FIG. 4 is a view taken in the direction of arrows 4—4 of FIG. 1.
Figure 5:
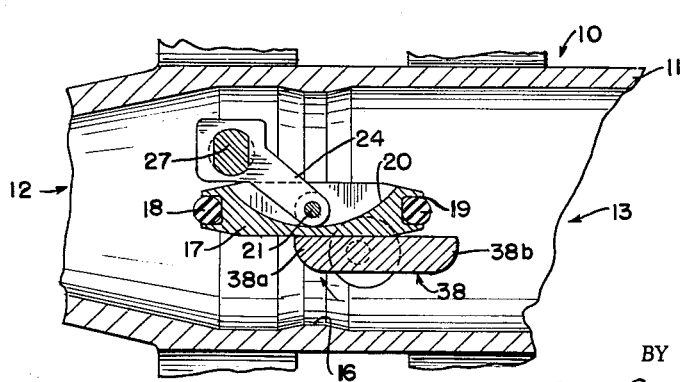
FIG. 5 is a view taken in the direction of the arrows 5—5 of FIG. 2.

The end of the mounting arm 24 opposite its connection with the butterfly pivot pin 21 is slidably but non-rotatably attached to a vertical flat-sided stud or mounting post 27. The post 27 is secured rigidly to the casing body and as best seen in FIGS. 3-5 may be laterally displaced from the center of the valve. For assembly purposes, the post 27 has been shown as extending through the casing 11 at the lower end thereof and has been provided with a seal 28. However, since the post 27 is rigidly attached to the casing, it is possible to seal the post permanently and in some instances without the use of a separate sealing member.

Displaced longitudinally of the butterfly pivot axis, and (see FIGS. 4 and 5) laterally of the longitudinal axis of the body 10, I provide a spindle 30. The spindle is attached at the upper end 30a thereof to a depending member 31 forming part of a rotary actuator, indicated generally by reference numeral 32 which may comprise, in a preferred form, a rotary solenoid. The member 31 is journalled within the valve casing 11 and is sealed with respect to the casing 11 by a seal 33 where the member 31 emerges from the interior of the valve body. The lower end 30b of the spindle is journalled within a lower cover plate 34. The plate 34 is fastened to the valve body by attaching screws 36 to permit access to the spindle. A seal 37 is located intermediate the casing 11 and plate 34.

Mounted to the spindle 30 generally at its center within the body 10, is a transversely extending rocker arm 38. As best seen in FIGS. 4 and 5, end portions 38a and 38b of the rocker arm on opposite sides of the pivot axis of the spindle, are adapted to contact alternatively, face portions of the butterfly member 17 at each side of the butterfly pivot axis, to cause rotation of the butterfly to open or closed positions. During such rotation, for example from the closed position of FIG. 4 to the full open position of FIG. 5, the portion 38a of the rocker arm, upon rotation of the spindle 30 by the rotary actuator 32, will slidably contact and push against the butterfly 17 as indicated by the arrow in FIG. 5.

During reverse movement of the butterfly (from the position of FIG. 5 to that of FIG. 4) the portion 38b of the rocker arm slides and pushes against the butterfly member 17. During this closing movement of the butterfly the sliding contact between the butterfly 17 and the rocker arm 38 permits the butterfly freedom to float about its universal connection with the mounting arm 24, and permits the arm 24 to slide, if necessary respective of stud 27. As the butterfly member nears its closed position, it may or may not be centered with respect to the valve seat 16. However, if the butterfly member is uncentered as it nears the closed position, there will be fluid flowing past the unclosed portion of the periphery and a corresponding pressure drop will result therefrom. Since the pressure on the butterfly member and the O-ring will be greatest where the ring engages valve seat 16, the resulting pressure differential will then tend to urge the butterfly and O-ring into the unclosed portion of the valve.

In practice it may be found that as the butterfly member nears its closed position in an uncentered position, fluid flows past a plurality of unclosed portions about the butterfly periphery. As the afore-described mounting means permits universal movement of the butterfly member and O-ring about its pivot and the pivot is slidable on the mounting post 27, the pressure differential will tend to urge the butterfly member into a centered position to close the plurality of openings without regard to their peripheral position and thereby provide even, sealing engagement between O-ring seal 18 and valve seat 16. The seat 16 may be formed as a continuous annulus since the butterfly pivot mounting to the valve body, and the actuating spindle 30 are each offset from the valve seat.

It will be appreciated that the above description relates to a particular embodiment and is merely representative. Therefore, changes may be made therefrom without departing from the clear teachings of the invention. In order to fully appreciate the spirit and scope of the invention, reference should be made to the appended claims.

I claim:

1. A butterfly valve comprising a disc-like butterfly member, a sealing member attached adjacent to the periphery of said member, a valve body surrounding said member having a longitudinal axis, means for pivotally mounting said butterfly member within said valve body including a pivot pin attached to said butterfly member extending generally perpendicular to said axis, a mounting arm extending generally perpendicular to said pin having one end receiving said pin for rotation of said pin therein, a mounting stud attached to the opposite end of said arm, said stud being rigidly affixed to said valve body, a valve seat formed in said body adapted to engage the sealing member when said butterfly valve is in a position transverse to the longitudinal axis of the valve body, the connection of the pivot pin and mounting arm being such to permit the butterfly member to be moved by the pressure of a fluid passing through the valve body between said body and peripheral edge portions of the butterfly member to reduce clearance between the periphery of the sealing member and the valve seat, and actuating means for contacting and rotating said butterfly member to open or closed positions respective of fluid flow through the valve body.

2. A butterfly valve according to claim 1 in which the sealing member is an O-ring seal.

3. A butterfly valve according to claim 1 in which the connection of the arm and pivot pin permits limited universal movement of the butterfly member with respect to the valve seat.

4. A butterfly valve according to claim 3 in which the mounting arm at its connection with the pivot pin defines a passage tapering at each end toward its center at which point the arm engages pin with a sliding fit.

5. A butterfly valve comprising a disc-like butterfly member, a resilient sealing member peripherally attached to said member, a valve body surrounding said member having a longitudinal axis, means for pivotally mounting said butterfly member within said valve body including a pivot pin attached to said butterfly member extending generally perpendicular to said axis, a mounting arm extending generally perpendicular to said pin having one end receiving said pin for rotation of said pin therein, a mounting stud attached to the opposite end of said arm, said stud being rigidly affixed to said valve body, a valve seat formed in said body adapted to engage the sealing member when said butterfly valve is in a position transverse to the longitudinal axis of the valve body, the connection of the pivot pin and mounting arm being such to permit the butterfly member to be moved by the pressure of a fluid passing through the valve body between said body and peripheral edge portions of the butterfly member to reduce clearance between the periphery of the sealing member and the valve seat, and an actuating mechanism comprising a rotatable actuating spindle, a push rod attached to said spindle having end portions spaced oppositely from the axis of rotation of said spindle, said end portions slidably contacting said butterfly member respectively at each side of the butterfly pivot axis, rotation of said spindle urging the end portions of the rocker arm against the butterfly to move the butterfly into open and closed positions, the axis of rotation of the spindle being spaced from the valve seat.

6. A butterfly valve comprising a generally cylindrical valve body, an annular valve seat formed in said body, a disc-like butterfly member, a peripherally mounted O-ring seal attached to said member and adapted to sealingly engage the surface of said annular valve seat, means for pivotally mounting said butterfly member about an axis extending through said valve seat, said butterfly member having a diameter less than the diameter of said valve seat, said butterfly mounting means being attached to said valve body at a distance from the pivot axis of said butterfly, and an actuating mechanism comprising a rotatable actuating spindle, a push rod attached to said spindle having end portions spaced oppositely from the axis of rotation of said spindle, said end portions slidably contacting said butterfly member respectively at each side of the butterfly pivot axis, rotation of said spindle urging the end portions of the rocker arm against the butterfly to move the butterfly into open and closed positions, the axis of rotation of the spindle being spaced from the valve seat.

7. A butterfly valve comprising a disc-like butterfly member, a sealing member peripherally attached to said butterfly member, a valve body adapted to pass a fluid therethrough, said body encompassing said butterfly member and having a longitudinal axis, means for actuating said butterfly member to a closure position transversely of the axis of said body, a generally cylindrical seat formed in said body for engagement with the sealing member when the butterfly member is in a closure position, and means independent of said actuating means for mounting said butterfly member, said mounting means rotatably supporting said butterfly member proximate the center thereof to permit said butterfly member to be moved by fluid pressure passing through the valve body between said body and peripheral edge portions of the butterfly member to reduce clearances between the periphery of the sealing member and the valve seat whereby the butterfly member will tend to be centered with respect to the valve seat and the sealing member tends to engage equally all surfaces of the valve seat.

8. A butterfly valve comprising a disc-like butterfly member, a resilient sealing member peripherally attached to said member, a valve body surrounding said member having a longitudinal axis, means for pivotally mounting said butterfly member within said valve body including a pivot pin attached to said butterfly member extending generally perpendicular to said axis, a mounting arm extending generally perpendicular to said pin and having one end receiving said pin for rotation therein, a mounting stud slidably attached to the opposite end of said arm, said stud being rigidly affixed to said valve body, a valve seat formed in said body adapted to engage the sealing member when said butterfly valve is in a position transverse to the longitudinal axis of the valve body, the connection of the pivot pin and mounting arm and the sliding connection of the arm with the mounting post being such to permit the butterfly member to be moved by the pressure of a fluid passing through the valve body between said body and peripheral edge portions of the butterfly member to reduce clearance between the periphery of the sealing member and the valve seat, and actuating means for contacting and rotating said butterfly member to open or closed positions respective of fluid flow through the valve body.

References Cited in the file of this patent

UNITED STATES PATENTS

| | | |
|---|---|---|
| 2,095,263 | Moss | Oct. 12, 1937 |
| 2,753,148 | Oetiker | July 3, 1956 |
| 2,835,269 | Seymour | May 20, 1958 |
| 2,873,942 | Drane | Feb. 17, 1959 |
| 2,978,222 | Henrion | Apr. 4, 1961 |

FOREIGN PATENTS

| | | |
|---|---|---|
| 811,551 | Great Britain | Apr. 8, 1959 |